(12) United States Patent
Goring et al.

(10) Patent No.: US 7,380,237 B2
(45) Date of Patent: May 27, 2008

(54) SYSTEM AND METHOD FOR EXTENDING CAPABILITIES AND EXECUTION EFFICIENCY OF SCRIPT BASED APPLICATIONS

(75) Inventors: Bryan R. Goring, Milton (CA); Michael Shenfield, Richmond Hill (CA); John F. A. Dahms, Waterloo (CA)

(73) Assignee: Research In Motion Limited, Waterloo, ON (CA)

( * ) Notice: Subject to any disclaimer, the term of this patent is extended or adjusted under 35 U.S.C. 154(b) by 825 days.

(21) Appl. No.: 10/787,949

(22) Filed: Feb. 27, 2004

(65) Prior Publication Data

US 2005/0076344 A1   Apr. 7, 2005

Related U.S. Application Data (60) Provisional application No. 60/508,203, filed on Oct. 2, 2003.

(51) Int. Cl.
   *G06F 9/44*   (2006.01)
(52) U.S. Cl. .................... 717/115; 717/107; 717/111; 717/121
(58) Field of Classification Search .............. None
   See application file for complete search history.

(56) References Cited

U.S. PATENT DOCUMENTS 5,675,804 A   10/1997   Sidik et al.

(Continued)

FOREIGN PATENT DOCUMENTS

| EP | 0 947 924 A | 10/1999 |
|---|---|---|
| WO | WO 03/003199 A | 1/2003 |

OTHER PUBLICATIONS

European Examination Report for European Patent Application No. 04710755.2, 4 pags, Dec. 19, 2006, European Patent Office.

(Continued)

*Primary Examiner*—Chuck Kendall
(74) *Attorney, Agent, or Firm*—Kevin Pillay; Gowling Lafleur Henderson LLP (57) ABSTRACT

Scripting Language based applications can be limited in their ability to supply and execute sophisticated logic and complex processing. More traditional programming languages contain explicit function and/or procedure calls to implement more complex functionality, however, these languages use more complicated syntax and traditionally require mosophisticated programming knowledge to use. There are provided systems and methods for extending the capabilities of an application program for execution by a terminal. The application includes a script based workflow and non-executable content. One such method comprises loading the workflow for interpretation by a script interpreter, such that the workflow is configured for having a plurality of executable elements. This method also provides a global symbol structure for reference by the executable elements, the global symbol structure including addressing for coupling selected ones of the executable elements to corresponding external components. The external components are provided by a native runtime environment of the terminal for performing the action specified by the selected executable elements. This method also executes the executable elements in sequence such that execution of the selected ones of the execution elements are redirected to the respective external components through the corresponding global symbols of the global symbol structure. Predefined knowledge of the contents of the global symbol structure is shared by the runtime environment and the workflow of the application.

41 Claims, 5 Drawing Sheets

U.S. PATENT DOCUMENTS 5,734,837 A * 3/1998 Flores et al. .................... 705/7
2004/0215700 A1* 10/2004 Shenfield et al. ........... 709/201

OTHER PUBLICATIONS

International Preliminary Report on Patentability for PCT International Application No. PCT/CA2004/000197, Mar. 30, 2006, 6 pages, International Preliminary Examining Authority.

International Search Report, International Application No. PCT/CA2004/000197, Filing date: Feb. 13, 2004, Priority date: Feb. 10, 2003.

Written Opinion of the International Searching Authority, International Application No. PCT/CA2004/000197, Filing date: Feb. 13, 2004, Priority date: Feb. 10, 2003.

* cited by examiner

SYSTEM AND METHOD FOR EXTENDING CAPABILITIES AND EXECUTION EFFICIENCY OF SCRIPT BASED APPLICATIONS

This application claims the benefit of provisional application No. 60/508,203, filed Oct. 2, 2003, which is incorporated herein by this reference.

BACKGROUND

The present application relates to the execution of script based application programs.

There is a continually increasing number of terminal devices in use today, such as mobile telephones, PDAs with wireless communication capabilities, personal computers, self service kiosks and two-way pagers. Software applications which run on these devices increase their utility. For example, a mobile phone may include an application which retrieves the weather for a range of cities, or a PDA may include an application that allows a user to shop for groceries. These software applications take advantage of connectivity to a network in order to provide timely and useful services to users. However, due to the restricted resources of some devices, developing software applications for a variety of devices remains a difficult and time-consuming task.

Scripting Language based applications can be limited in their ability to supply and execute sophisticated logic and complex processing. More traditional programming languages contain explicit function and/or procedure calls to implement more complex functionality, however, these languages use more complicated syntax and traditionally require more sophisticated programming knowledge to use.

A further disadvantage of traditional programming languages in that they are not completely neutral to the platform used for executing the applications. Another disadvantage of current scripting languages, such as JavaScript, and traditionally programming languages, such as C++, is that the programming capabilities of the languages are not extensible.

Extendable script based systems and methods are disclosed to obviate or mitigate at least some of the above-presented disadvantages.

SUMMARY

Scripting Language based applications can be limited in their ability to supply and execute sophisticated logic and complex processing. More traditional programming languages contain explicit function and/or procedure calls to implement more complex functionality, however, these languages use more complicated syntax and traditionally require more sophisticated programming knowledge to use. A further disadvantage of traditional programming languages in that they are not completely neutral to the platform used for executing the applications. Contrary to current systems and methods for implementing script based workflows, there is provided systems and methods for extending the capabilities of an application program for execution by a terminal. The application includes a script based workflow and non-executable content. One such method comprises loading the workflow for interpretation by a script interpreter, such that the workflow is configured for having a plurality of executable elements. This method also provides a global symbol structure for reference by the executable elements, the global symbol structure including addressing for coupling selected ones of the executable elements to corresponding external components. The external components are provided by a native runtime environment of the terminal for performing the action specified by the selected executable elements. This method can also execute the executable elements in sequence such that execution of the selected ones of the execution elements are redirected to the respective external components through the corresponding global symbols of the global symbol structure. Predefined knowledge of the contents of the global symbol structure is shared by the runtime environment and the workflow of the application.

A method is disclosed for extending the capabilities of an application program for execution by a terminal, the application including a script based workflow and non-executable content, the method comprising the steps of: loading the workflow for interpretation by a script interpreter, the workflow configured for having a plurality of executable elements; providing a global symbol structure for reference by the executable elements, the global symbol structure including addressing for coupling selected ones of the executable elements to corresponding external components, the external components provided by a native runtime environment of the terminal for performing the action specified by the selected executable elements; and executing the executable elements in sequence such that execution of the selected ones of the execution elements are redirected to the respective external components through the corresponding global symbols of the global symbol structure; wherein predefined knowledge of the contents of the global symbol structure is shared by the runtime environment and the workflow of the application.

A terminal configured for extending the capabilities of an application program for execution by a native runtime environment is also disclosed, the application including a script based workflow and non-executable content, the terminal comprising: a script interpreter for interpreting the workflow, the workflow configured for having a plurality of executable elements; a global symbol structure configured for reference by the executable elements, the global symbol structure including addressing for coupling selected ones of the executable elements to corresponding external components, the external components provided by the native runtime environment of the terminal for performing the action specified by the selected executable elements; a proxy redirector module for redirecting the selected ones of the execution elements during execution of the workflow, the selected ones of the execution elements being redirected to the respective external components through the corresponding global symbols of the global symbol structure; wherein predefined knowledge of the contents of the global symbol structure is shared by the runtime environment and the workflow of the application.

A computer program product is also provided for extending the capabilities of an application program for execution by a native runtime environment of a terminal, the application including a script based workflow and non-executable content, the computer program product comprising: a computer readable medium; a script interpreter module stored on the computer readable medium for interpreting the workflow, the workflow configured for having a plurality of executable elements; a global symbol structure stored on the computer readable medium configured for reference by the executable elements, the global symbol structure including addressing for coupling selected ones of the executable elements to corresponding external components, the external components provided by the native runtime environment of the terminal for performing the action specified by the selected executable elements; a proxy redirector module coupled to the global symbol structure for redirecting the selected ones of the execution elements during execution of the workflow, the selected ones of the execution elements being redirected to the respective external components through the corresponding global symbols of the global symbol structure; wherein predefined knowledge of the contents of the global symbol structure is shared by the runtime environment and the workflow of the application.

BRIEF DESCRIPTION OF THE DRAWINGS

These and other features will become more apparent in the following detailed description in which reference is made to the appended example drawings, wherein.

DETAILED DESCRIPTION

Network System

Figure 1:
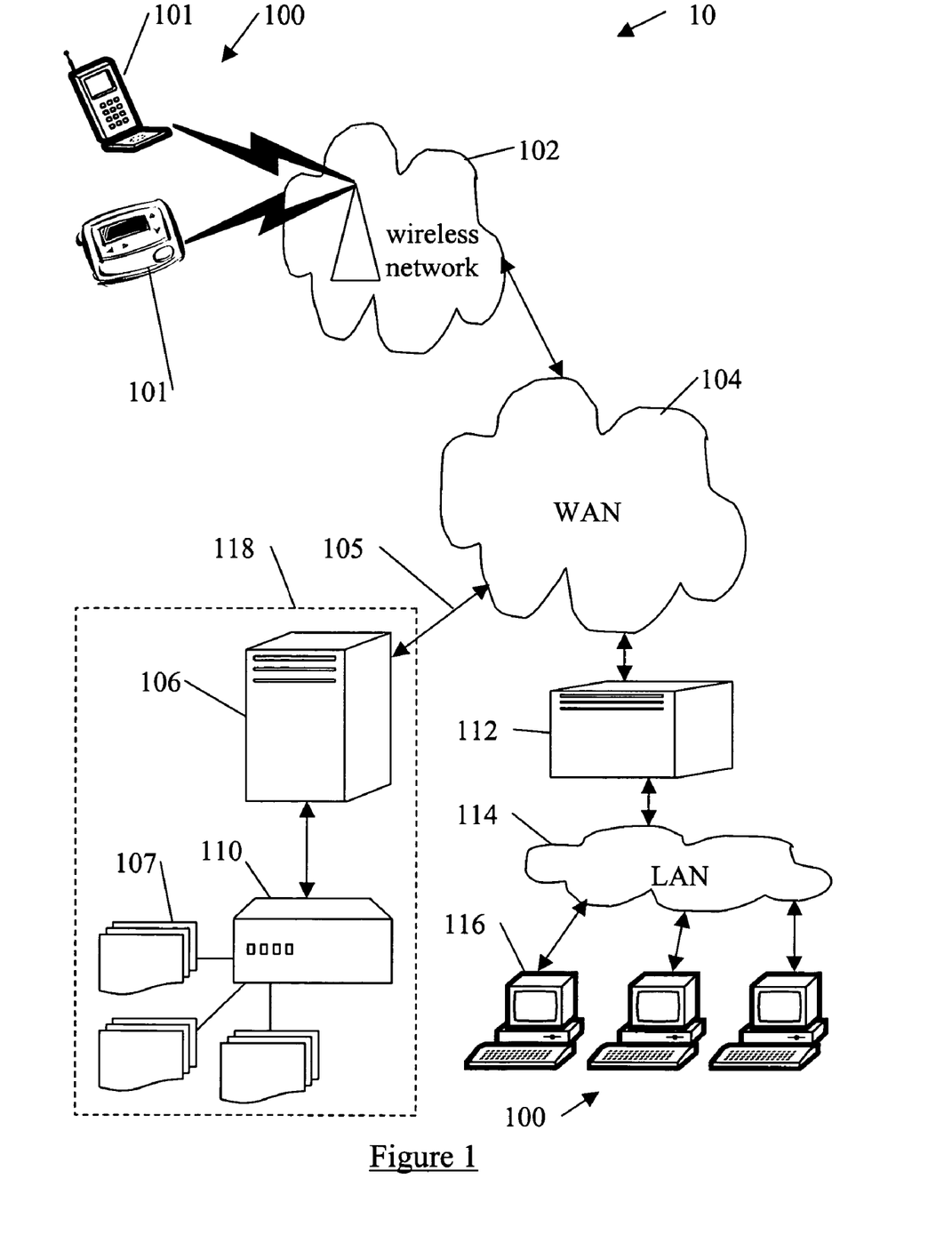
FIG. 1 is a block diagram of a network system.

Referring to FIG. 1, a network system 10 comprises a plurality of terminals 100 for interacting with one or more application servers 110 accessed by a server 106, which can be a management server, via a coupled Wide Area Network (WAN) 104 such as but not limited to the Internet. The terminals receive application programs 107 from the application server 110 via the server 106 over the network 104. The generic terminals 100 can be any suitable computing platform such as but not limited to wired devices such as desktop terminals 116 or other wired devices (e.g., notebook computer), wireless devices 101, PDAs, self-service kiosks and the like. Further, the system 10 can also have a gateway server 112 for connecting the desktop terminals 116 (or other wired devices) via a Local Area Network (LAN) 114 to the server 106.

Further, the system 10 can have a wireless network 102 for connecting the wireless devices 101 to the WAN 104. It is recognized that other terminals and computers (not shown) could be connected to the server 106 via the WAN 104 and associated networks other than as shown in FIG. 1. The generic terminals 100, wireless devices 101 and personal computers 116 are hereafter referred to as the terminal 100 for the sake of simplicity. Further, the networks 102, 104, 114 of the system 10 will hereafter be referred to as the network 104, for the sake of simplicity. It is recognized that there could be multiple servers 106, 110, and/or that the functionality of the servers 106 and 110 could be combined, if desired. It is further recognized that the servers 106, 110 could be implemented by a service provider 118 providing a schema-defined service, such as a web service by example. Further, the terminals 100 could also operate as stand-alone devices when obtaining and executing the application 107. For example, the application can be loaded onto terminals via a computer readable medium 212, (see FIG. 2), as further defined below; in addition, or instead, the application can be loaded onto the terminal via a direct wired connection (e.g., USB port, serial interface, etc.) to an external media device or computing platform.

This system 10 applies to applications 107 that are partitioned into an associated script based workflow 307 (see FIG. 3), and non-executable content. Non-executable content may be discrete elements or templates that describe application entities in some predefined language (such as but not limited to structured definition languages such as XML). Content is evaluated within a Container Framework 206 (see FIG. 3) of the terminal 100 and is available to the workflow script 307 as a library of Global Symbols 324 (see FIG. 3). This library helps to proxy access to the appropriate service 304 or obtains the requested data. The process of addressing external non-executable entities of the application 107 by the workflow is referred to as Proxied Redirection, as further described below. The application 107 provisioned on the terminal 100 can also have access to local entities through a local symbol table 322 (see FIG. 3).

Generic Terminal

Figure 2:
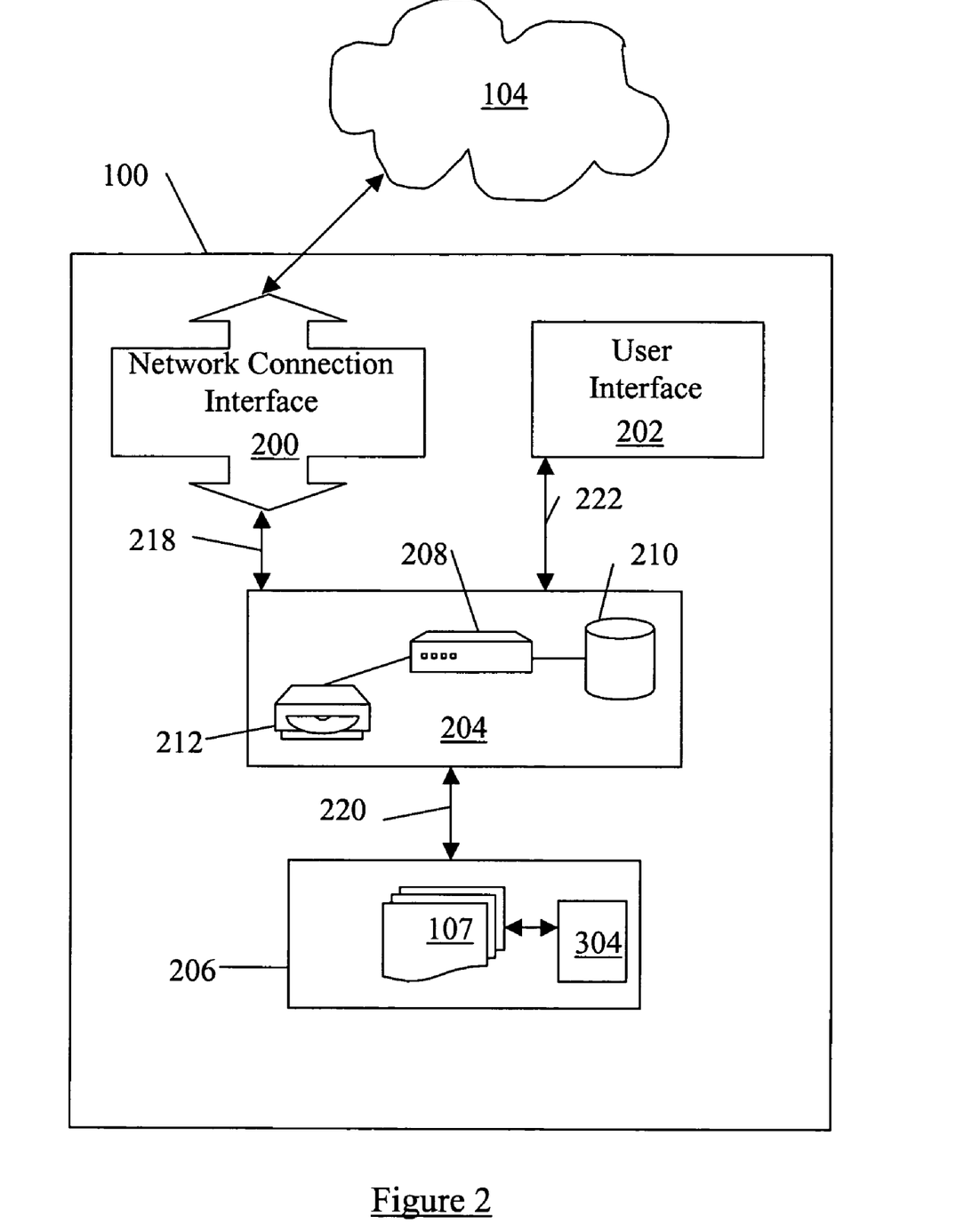
FIG. 2 is a block diagram of a generic terminal of FIG. 1.

Referring to FIG. 2, the terminals 100 can include, without limitation, mobile telephones (or other wireless devices), PDAs, notebook and/or desktop computers, two-way pagers or dual-mode communication terminals. The terminals 100 include a network connection interface 200, such as a wireless transceiver or a wired network interface card or a modem, coupled via connection 218 to a terminal infrastructure 204. The connection interface 200 is connectable during operation of the terminals 100 to the network 104, such as to the wireless network 102 by wireless links (e.g., RF, IR, etc.) (see FIG. 1), which enables the terminals 100 to communicate with each other and with external systems (such as the server 106—see FIG. 1) via the network 104 and to coordinate the requests/response messages 105 between the terminals 100 and the servers 106, 110. The network 104 supports the transmission of the application programs 107 in the requests/response messages 105 between terminals 100 and external systems, which are connected to the network 104. The network 104 may also support voice communication for telephone calls between the terminals 100 and terminals which are external to the network 104. A wireless data transmission protocol can be used by the wireless network 102, such as but not limited to DataTAC, GPRS or CDMA.

Referring again to FIG. 2, the terminals 100 also have a user interface 202, coupled to the terminal infrastructure 204 by connection 222, to facilitate interaction with a user (not shown). The user interface 202 can includes one or more user input devices such as but not limited to a QWERTY keyboard, a keypad, a trackwheel, a stylus, a mouse, a microphone and one or more user output devices such as an LCD screen display and/or a speaker. If the screen is touch sensitive, then the display can also be used as the user input device as controlled by the terminal infrastructure 204.

Referring again to FIG. 2, operation of the terminal 100 is enabled by the terminal infrastructure 204. The terminal infrastructure 204 includes the computer processor 208 and the associated memory module 210. The computer processor 208 manipulates the operation of the network interface 200, the user interface 202 and the framework 206 of the communication terminal 100 by executing related instructions, which are provided by an operating system and client application programs 107 located in the memory module 210; the computer processor 208 can include one or more processing elements that may include one or more general purpose processors and/or special purpose processors (e.g., ASICs, FPGAs, DSPs, etc.). Further, it is recognized that the terminal infrastructure 204 can include a computer readable storage medium 212 coupled to the processor 208 for providing instructions to the processor for loading and executing client application programs 107. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Processing Framework

Referring to FIG. 2, a client runtime environment is provided by the processing framework 206. Multiple such runtime environments could potentially be available for use by the processing framework 206 of a given terminal 100. The framework 206 of the terminal 100 is coupled to the infrastructure 204 by the connection 220 and is an interface to the terminal 100 functionality of the processor 208 and associated operating system of the infrastructure 204. The client runtime environment of the terminals 100 is preferably capable of generating, hosting and executing the client application programs 107 on the terminal 100; if multiple runtime environments are available, a particular one can be selected for use with a given application program 107. Once loaded onto the terminal 100, the applications 107 can be executed by the component framework 206 on the device 100, which can convert the component applications 107 into native code, which is executed by the processor 208 in the device infrastructure 204. Alternatively, the applications 107 may be executed as native code or interpreted by another software module or operating system on the terminal 100. In any event, the applications 107 are run in a terminal runtime environment provided by the terminal 100; the client runtime is potentially one selected from a set of available client runtime environments. Referring again to FIG. 1, one or more of the client runtime environments provided by the terminal 100 can be configured to make the terminals 100 operate as web clients of the web services (of a web service 118). It is recognized that the client runtime environment can also make the terminals 100 clients of any other generic schema-defined services supplied by the service 118. The framework 206 hosts and evaluates the application 107, as well as provides services 304 to interpret workflow components, evaluate non-executable application entities, and resolve application references to non-executable content or built in functionality.

Figure 3:
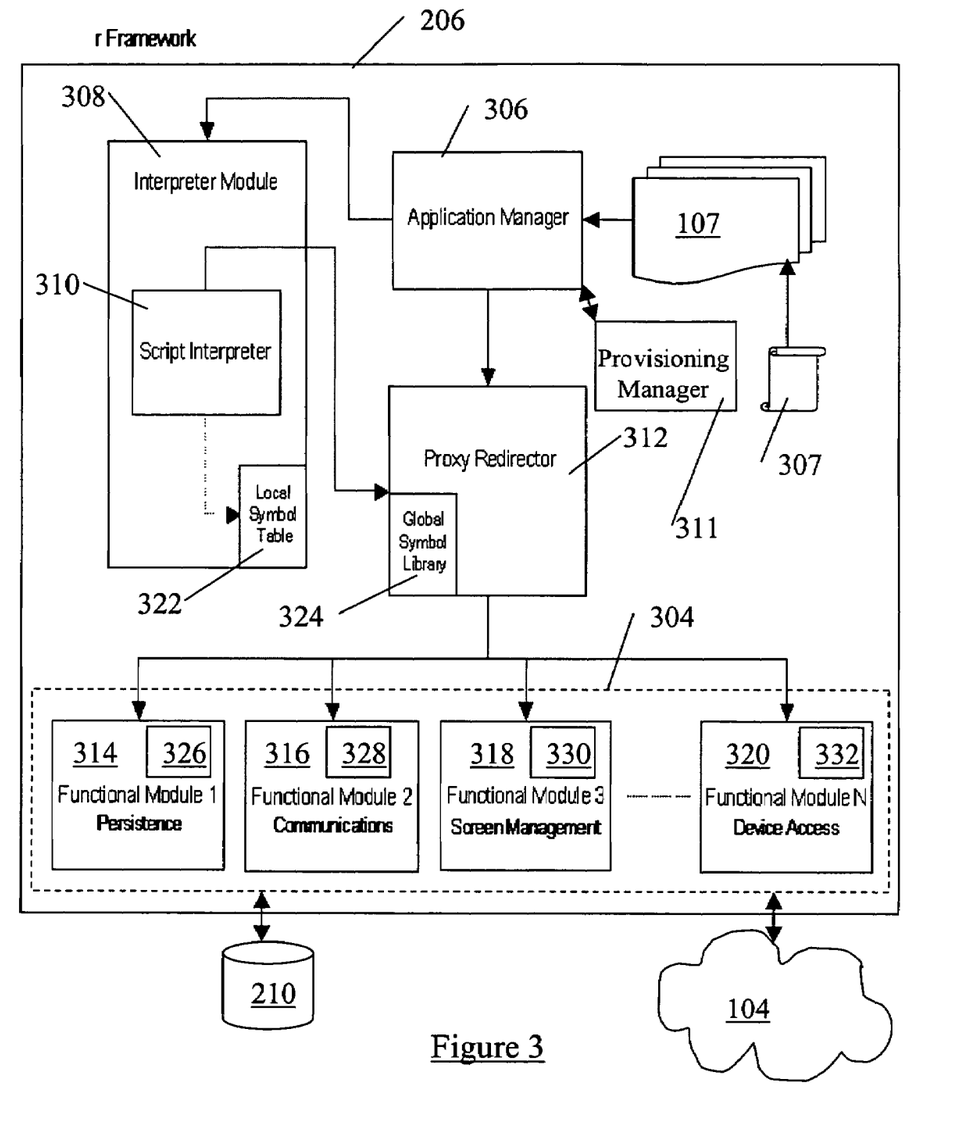
FIG. 3 shows a processing framework of the terminal of FIG. 2.

One or more of the terminal runtime environment of the framework 206 preferably support the following basic functions for the resident executable versions of the client application programs 107 (see FIG. 2), such as but not limited to:

have predefined knowledge of the local symbol table 322 (see FIG. 3) and the global symbol table 324 (see FIG. 3). The knowledge of the contents of the global symbol table 324 is shared between the application 107 and the framework 206;

provide a communications capability to send messages 105 to the server 106 via the network 104;

provide data input capabilities by the user on an input device of the terminals 100 to supply data parts for outgoing messages 105 to the server 106;

provide data presentation or output capabilities for response messages 105 (incoming messages) or uncorrelated notifications of the server 106;

provide data storage services to maintain local client data in the memory module 210 (see FIG. 2) of the terminal 100; and provide an execution environment for a scripting language for coordinating operation of the application 107.

Further, specific functions of the client runtime environment can include, without limitation, service support for language, coordinating memory allocation, networking, management of data during I/O operations, coordinating graphics on an output device of the terminals 100 and providing access to core object oriented classes and supporting files/libraries. Examples of the runtime environments implemented by the terminals 100 can include such as but not limited to Common Language Runtime (CLR) by Microsoft and Java Runtime Environment (JRE) by Sun Microsystems.

Referring again to FIG. 3, the processing framework 206 implements the ability to extend script based commands of the application 107 through the global symbol table 324, further described below. The Processing Framework 206 can provide generic service module 304 functionality separate from the application program 107. Further, the framework 206 can also have other modules such as but not limited to; an Application Manager 306, an Interpreter Module 308, a Script Interpreter 310, a provisioning manager 311 and a Proxy Redirector 312. It is recognised that separate service functionality is shared by a plurality of applications 107. The service modules 304 include such as but not limited to a Persistence Module 314, a Communications Module 316, a Screen (presentation) Module 318 and a Device Access Module 320.

Referring again to FIG. 3, the generic service modules 304 interact with the application 107 through the global symbol table 324. The functionality of commands of the script 307 of the application 107 are enhanced or otherwise extended through interaction with functional and/or non-executable components 326, 328, 330, 332 operated by the modules 304, as further described below. The communication service 316 manages connectivity between the component application programs 107 and the external system 10 via the network 104, including the ability to communicate with the server 106 as required during execution of the application 107. The persistence manager 314 allows updated data content of the application programs 107 to be stored in the memory module 210. The screen manager 318 interacts with the user interface 202 (see FIG. 2) to obtain input from the user and display or otherwise present output to the user of the terminal 100. The screen manager 318 is responsible for communicating data to and from the interface 202, which is expressed in a native format of the terminal 100. The device access module 320 monitors interaction between the various application programs 107 and other functional entities (such as the modules 304) resident on the terminal 100. It is recognised that other configurations and partitioning of functionality of the modules 304 with respective services 314, 316, 318, 320 for extending the functionality of the application script 307 can be other than shown, as desired.

Referring again to FIG. 3, the framework 206 has the provisioning manager 311 that manages the provisioning of the software applications 107 on the terminal 100. Application provisioning can include storing, retrieving, downloading and removing applications 107, and configuring the application programs 107 for access to services 304 which are accessible the global symbol table 324. The Application Manager 306 can be used to interact with the user interface 202 (see FIG. 2), manages application lifetime etc. The Interpreter Module 308 manages references to workflow native local symbols 322 and external Global Symbols 324. The Script Interpreter 310 executes the script 307 in the language of the workflow of the application 107. The Script Interpreter 310 is depicted as a component of the Interpreter Module 308; however, the Script Interpreter 310 can be a stand-alone component in other implementations. The Proxy Redirector 312 handles requests to any of the set of Global Symbols 324 and directs the request to the appropriate service module 304 for subsequent extension of the script function. Global Symbols of the table 324 are references from within the executable workflow of the script 307 to components 326, 328, 330, 332 that are provided by the Container Framework 206. These global symbols 324 contain implicitly the details of functionality as required by the applications 107. Local Symbols of the table 322 are references from within the executable workflow of the script 307 for entities that are defined elsewhere in the application 107 (such as but not limited to non-executable entities). The local symbols of the table 322 represent local functionality provided by the application program 107, as compared to the global symbols of the table 324 that provide extended capabilities through the service modules 304.

It is recognized that other configurations of the processing framework 206 with respective services 306, 308, 310, 312 for implementing the symbol tables 322, 324 can be other than shown, as desired. Such alternate configurations can include, without limitation, alternative distribution among functionality among services and/or combination of functionality within other services.

Proxied Processing

Figure 4:
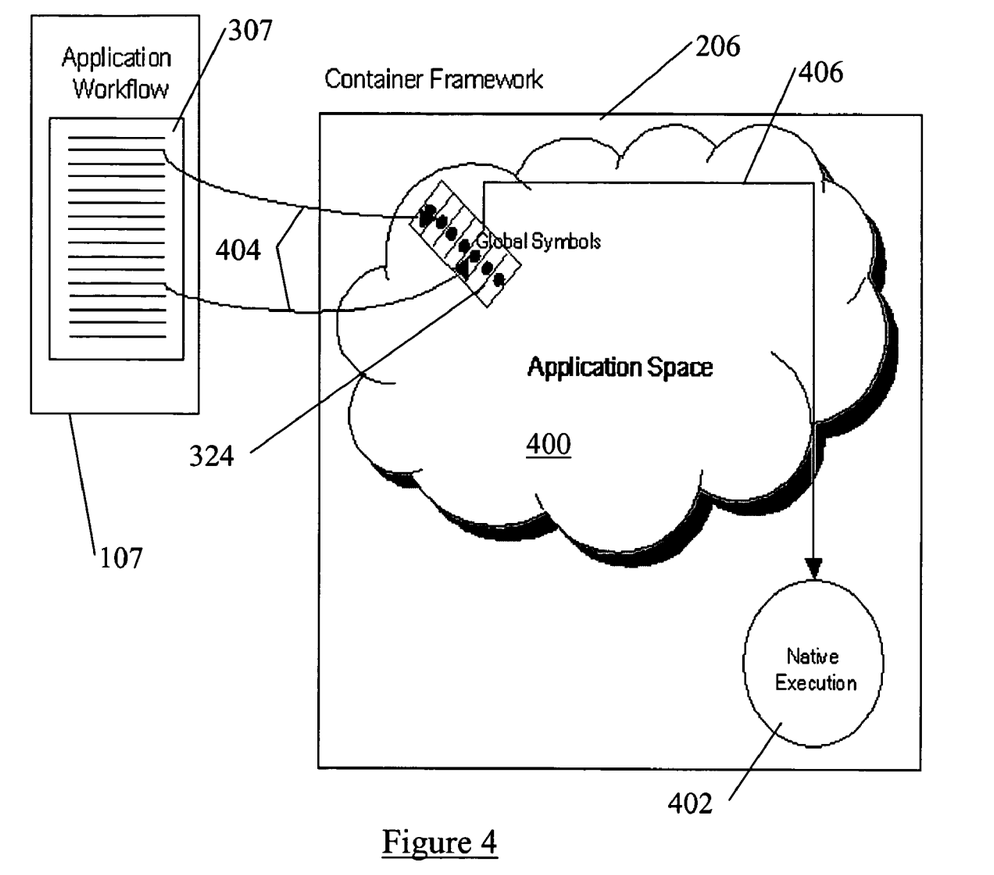
FIG. 4 shows representation of application spaces of the application of FIG. 3.

Referring to FIG. 4, in the case of a mixed content application 107 it is typically not possible to execute the entire application 107 monolithically within one scope. Rather it is convenient to model some aspects of the application 107 in a separate space 400, and allow discrete executable units of the script 307 to address and manipulate that space 400 through the table 324 or other data structure. The table 324 is coupled to the set of Global Symbols that are provided to the Proxy Redirector 312 (see FIG. 3) and are available to the Script Interpreter 310 (see FIG. 3) in the semantics of the scripting language of the script 307. This approach allows discrete and non-continuous executable segments of the script 307 to address and manipulate the framework 206 based components 326, 328, 330, 332 uniformly, affecting the behavior of the application 107 as a whole. For example, FIG. 4 shows a visual representation of the application spaces 400 as they are distributed at runtime. As depicted, the application workflow 307 makes reference 404 to symbols 324 that are defined in the nebulous space 400 of non-executable application entities (shown as cloud 400). Through services 304 (see FIG. 3) supplied by the container framework 206, these accesses are proxied 406 to the actual native execution space 402 of the terminal 100 required to satisfy the reference. The native execution space 402 includes access to the external (in regard to the application 107) components 326, 328, 330, 332 of the service modules 304 that can be resident on the framework 206 of the terminal 100.

External Components

Referring again to FIG. 3, the external components 326, 328, 330, 332 are accessed via the global symbols 324 through the corresponding service modules 314, 316, 318, 320. The component 326 can represent a data component, which can be used to define data entities, which are referenced by the script 307. Examples of data components 326 may include orders, users, and financial transactions. Data components 326 can define what information is required to describe the data entities, and in what format the information is expressed. For example, the data component 326 may, in a particular instance, define an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 326. Further, referring to FIG. 1, since data parts (elements) are usually transferred from message 105 to message 105 according to Web Service 118 choreography rules, preferably there is persistence of data components 326. It is recognised that data components 326 may be dynamically generated according to Web Service(s) 118 choreography definitions (if available) or defined by the application designer based on complex type definitions and/or message correlation information.

Referring again to FIG. 3, the external component 328 can represent a message component 404, which can define the format of messages used by the component application program 107 to communicate with other resident applications 107 on the terminal 100 and/or external systems such as the web service 118 (see FIG. 1). For example, one of the message components 328 may describe, in a particular instance, a message for placing an order, which includes the unique identifier for the order, the status of the order, and notes associated with the order. Message component 328 definitions can, in some instances, be written in a structured definition language and, in some such instances, can uniquely represent (and map to) WSDL messages, and can be generated dynamically at runtime. Accordingly, the dynamic generation can be done for the component definitions for client application messages 105 (see FIG. 1), and associated data content, from standard Web Service 118 metadata in a definition language used to express the web service interface, such as, but not limited to, WSDL and BPEL.

Referring again to FIG. 3, the external component 330 can represent a presentation component. The presentation component 330 can define the appearance and behavior of the component application program 107 as it displayed by the user interface 202 (see FIG. 2). The presentation components 330 can specify GUI screens and controls, and actions to be executed when the user interacts with the component application 107 using the user interface 202. For example, the presentation components 330 may define screens, labels, edit boxes, buttons and menus, and actions to be taken when the user types in an edit box or pushes a button. The majority of Web Service 118 (see FIG. 1) consumers use a visual presentation of Web Service operation results, and therefore provide the runtime environment on their terminals 100 capable of displaying user interface screens.

Proxied Referencing

Referring to FIGS. 3 and 4, Proxied Referencing is the process by which the Script Interpreter 310 may satisfy requests 404 for framework 206 based components 326, 328, 330, 332 that are typically not available in the language of the workflow 307. The Proxied Redirector 312 relies on the set of symbols that are supplied by the Application Manager 306 when the application 107 starts. These symbols 324 may correspond to components that are defined by the application 107 itself (i.e. local symbols 322), or may correspond to functionality that is provided by the framework 206 (i.e. global symbols 324). In either case, the set of symbols is completely arbitrary to the Interpreter Module 308. It is recognized that the potential contents of the global symbol library 324 is fixed knowledge shared between the developer of the script 307 and the developer of the functional modules 304 providing the externally referenced functionality linked via the global symbols 324.

Proxied Referencing Scheme by Example

Referring to FIGS. 3 and 4, to illustrate how a proxied scheme 500 (see FIG. 5) may apply to the type of applications 107 described, take the case of a sample set of applications 107 that use a scripting language (such as ECMAScript) to define workflow elements of the script 307 and allows expression of Screens 330, Messages 328 and Data 326 components in some structured language (such as XML). It is recognized that the corresponding functional modules 318, 316, 314 for providing access to the components 330, 328, 326 can be based on the native runtime language, or optionally one or more languages.

Screens 330

Screens 330 describe visual components that are presented and displayed to the user. Screens 330 specify how interaction with a user is handled. As part of its definition, the Screen 330 specifies all of the data collection fields that comprise it and how information is presented. The screen 330 is referenced by its name, for example scrName, (a global symbol 324) and supports access to any of its various data fields and can also provides built in functions such as but not limited to:

check( ); and
display( ).

Messages 328

Messages 328 are composed of various fields that are carried to and from the application 107. The message 328 is referenced by name, for example msgName, (a global symbol 324) and supports such as but not limited to the functional ability to send( ). All fields of the message 328 may be addressed by name.

Data 326

Data 326 are composed of addressable fields and are referenced by name, for example dataName, (a global symbol 324). The data 326 may be such as but not limited to load( )'ed and save( )'ed. The load( ) operation specifies a parameter that uniquely identifies the Data 326.

Workflow

Workflow elements of the script 307 can be are written in a suitable scripting and/or coding language such as ECMAScript and are addressable by name, workflowName, (a global symbol 324).

A sample workflow is given below. This workflow shows a typical scripting language that has embedded references to external symbols 324 that are associated with the Framework 206. These symbols are:

scrOrderEntry and scrCompanyInfo, both variables representative of typical Screen 330 global objects 324;
dataCompany, a variable representative of Data 326 global object 324; and
msgGetSubsidiaries, a variable representative of Message 328 global object 324.

In addition, each of these references 404 is further refined by accessing either fields of the non-executable content (plain text) or functions (italics).

Figure 5:
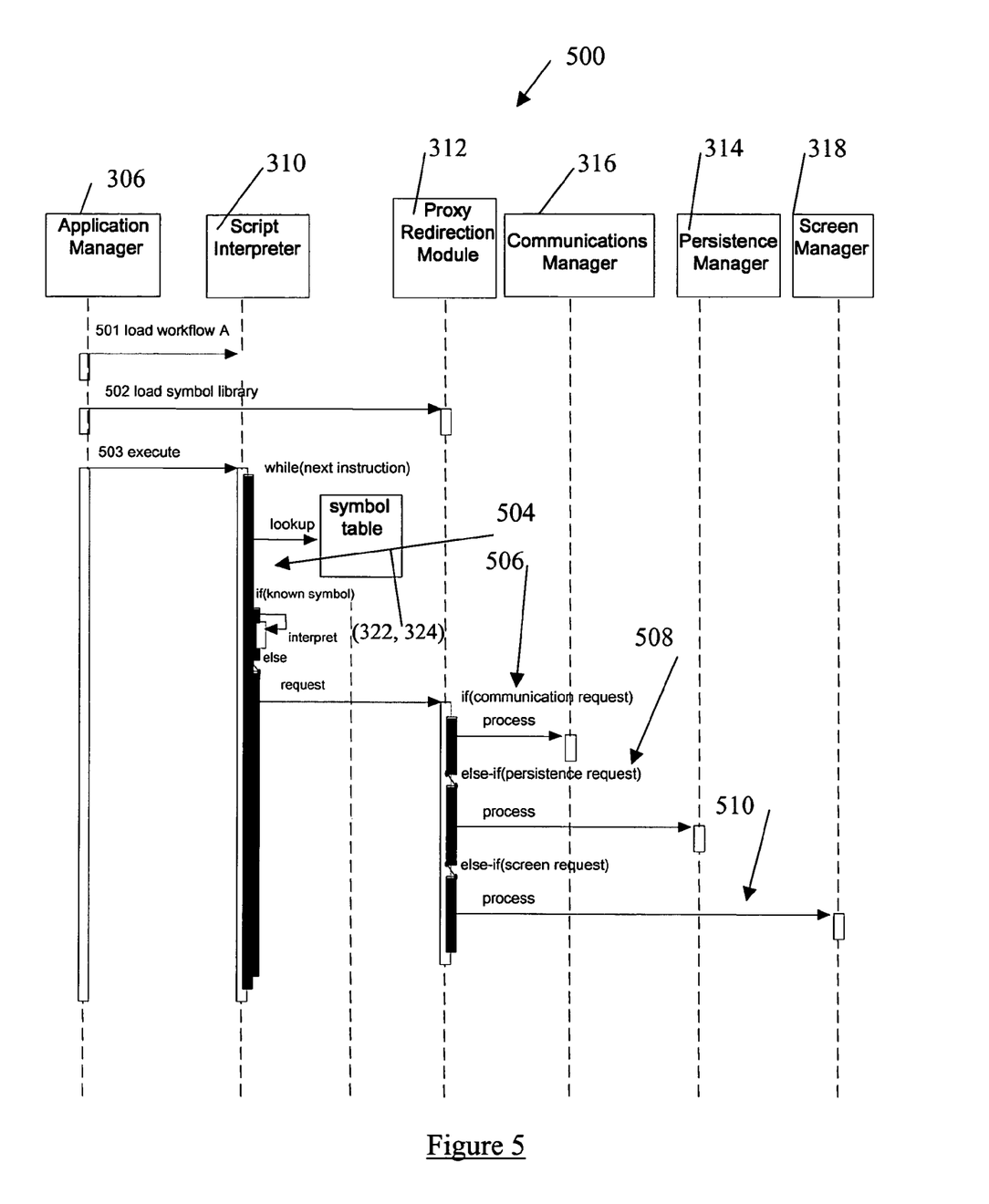
FIG. 5 is as sample workflow "getcompanyInfo" for the script of FIG. 4.

```
Workflow: getCompanyInfo {
    scrOrderEntry.check("itemId");
    companyName = scrOrderEntry.partVendor;
    company = dataCompany.load(companyName);
    if(company.hasSubsidiaries) {
        msgGetsubsidiaries.send( );
    }
    scrCompanyInfo.display( );
}
```

Referring to FIG. 5 the scheme 500 illustrates how the various modules of FIG. 3 inter-operate to achieve the goal of vectoring requests for these global symbols 324 to the framework 206.

The series of steps for executing this workflow 307 are as follows:

1. At some point during the application 107 evaluation by the Application Manager 306 a request for execution of workflow script 307 getCompanyInfo is made;
2. The Application Manager 306 instructs 501 the Script Interpreter 310 of the Interpreter Module 308 to load the workflow 307;
3. The Application Manager 306 supplies 502 the symbol library 322, 324 to the Proxy Redirection Module 312 that satisfies all external references to messages 328, screens 330 and data 326 components.
4. The Application Manager 306 then instructs the Script Interpreter to begin executing 503 the script 307. The script 307 is interpreted as a series of symbols 322, 324 that are recognized as either being language defined (i.e. reserved), declared (i.e. by the script 307) as local symbols 322, or unknown, that is external symbols 324;
5. References 404 to unknown symbols 324 such as the screen scrCompanyInfo or msgGetSubsidiaries, are passed 504 to the Proxy Redirection Module 312;
6. The Proxy Redirection Module 312 recognizes the symbol from its Global Symbol library 324 as provided by the Application Manager 306; and
7. The Proxy Redirection Module 312 processes the reference, supplying requested fields or executing requests such as message send( ) by addressing 506, 508, 510 them to the appropriate framework service 316, 314, 318 respectively.

The above description relates to one or more exemplary systems and methods. Many variations will be apparent to those knowledgeable in the field, and such variations are within the scope of the application.

For example, although XML and a subset of ECMAScript are used in the examples provided, other languages and language variants may be used to define the components 326,328,330 and the script 307, as desired. Further, using this approach the system 10 as a whole may expand application 107 execution beyond the capabilities of the scripting language of the script 307. Complex processing or more sophisticated logic can be moved to the framework 206 where it may be handled more efficiently (i.e. natively) and shared by a plurality of the applications 107.

The application 107 may be completely neutral to the type of Framework 206 that the application 107 is addressing. Moreover this approach can facilitate greater extensibility of the system 10 as the Framework 206 exports an arbitrary set of the Global Symbols 324 that may be enhanced at a later time. In this way the scripting grammar of the script 307 can remain unchanged while programming capabilities at the developers disposal can be extended through modification of the reference 406 (see FIG. 4) linking the individual script elements of the script 307 to the shared service modules 304, as well as through modification of the contents of the components 326, 328, 330, 332.

The embodiments of the invention in which an exclusive property or privilege is claimed are defined as the follows:

1. A method for extending the capabilities of an application program for execution by a terminal, the application including a script based workflow and non-executable content, the method comprising the steps of:
loading the workflow for interpretation by a script interpreter, the workflow configured for having a plurality of executable elements;
providing a global symbol structure for reference by the executable elements, the global symbol structure including addressing for coupling selected ones of the executable elements to corresponding external components, the external components provided by a native runtime environment of the terminal for performing the action specified by the selected executable elements; and
executing the executable elements in sequence such that execution of the selected ones of the execution elements are redirected to the respective external components through the corresponding global symbols of the global symbol structure;
wherein predefined knowledge of the contents of the global symbol structure is shared by the runtime environment and the workflow of the application.

2. The method according to claim 1 further comprising the step of referencing the executable elements to an arbitrary structure selected from the group comprising the global symbol structure and a local symbol structure.

3. The method according to claim 2, wherein the global symbol structure is configured to contain references between the executable elements and the external components provided by a plurality of service modules comprising a service framework.

4. The method according to claim 3, wherein the local symbol structure is configured to contain references between the executable elements and a set of local components defined elsewhere locally in the application.

5. The method according to claim 4, wherein the local symbol structure and the global symbol structure comprise the arbitrary structure for reference by the script interpreter.

6. The method according to claim 2 further comprising the step of employing a proxy redirector module for coordinating the reference to the global symbols and directing the corresponding request to the appropriate external component.

7. The method according to claim 6, wherein the external component is provided by a service module, the service module is a communication service for accessing message ones of the external components.

8. The method according to claim 7, wherein the message component defines a format of messages used by the application for interaction with other applications.

9. The method according to claim 6, wherein the external component is provided by a service module, the service module is a persistence service for accessing data ones of the external components.

10. The method according to claim 9, wherein the data component defines data entities referenced by the executable elements.

11. The method according to claim 6, wherein the external component is provided by a service module, the service module is a presentation service for accessing presentation ones of the external components.

12. The method according to claim 11, wherein the presentation component defines the presentation and behavior of the application when presented on a user interface of the terminal.

13. The method according to claim 2, wherein the workflow is expressed in a platform neutral scripting language.

14. The method according to claim 13, wherein the external component is provided by a service module, the service module is configured for modification external to the expression of the executable elements of the workflow.

15. The method according to claim 13, wherein the external components are configured for modification external to the expression of the executable elements of the workflow.

16. The method according to claim 2 further comprising executing the execution elements as the non-executable content including templates for describing application entities in a predefined language.

17. The method according to claim 16, wherein the language is a structured definition language.

18. The method according to claim 17, wherein the structured definition language is based on XML.

19. The method according to claim 2 further comprising the step of sharing the external components by a plurality of the applications.

20. The method according to claim 2, wherein the application is provided by a schema defined service through a network server coupled to the terminal, the terminal selected from the group comprising wired devices and wireless devices.

21. A terminal configured for extending the capabilities of an application program for execution by a native runtime environment, the application including a script based workflow and non-executable content, the terminal comprising:
a script interpreter for interpreting the workflow, the workflow configured for having a plurality of executable elements;
a global symbol structure configured for reference by the executable elements, the global symbol structure including addressing for coupling selected ones of the executable elements to corresponding external components, the external components provided by the native runtime environment of the terminal for performing the action specified by the selected executable elements;
a proxy redirector module for redirecting the selected ones of the execution elements during execution of the workflow, the selected ones of the execution elements being redirected to the respective external components through the corresponding global symbols of the global symbol structure;
wherein predefined knowledge of the contents of the global symbol structure is shared by the runtime environment and the workflow of the application.

22. The terminal according to claim 21 further comprising the executable elements referenced to an arbitrary structure selected from the group comprising the global symbol structure and a local symbol structure.

23. The terminal according to claim 22 further comprising a plurality of service modules comprising a service framework, wherein the global symbol structure is configured to contain references between the executable elements and the external components provided by the service framework.

24. The terminal according to claim 23, wherein the local symbol structure is configured to contain references between the executable elements and a set of local components defined elsewhere locally in the application.

25. The terminal according to claim 24, wherein the local symbol structure and the global symbol structure comprise the arbitrary structure for reference by the script interpreter.

26. The terminal according to claim 22 further comprising the proxy redirector module coordinating the reference to the global symbols and directing the corresponding request to the appropriate external component.

27. The terminal according to claim 26, wherein the external component is provided by a service module, the service module is a communication service for accessing message ones of the external components.

28. The terminal according to claim 27, wherein the message component defines a format of messages used by the application for interaction with other applications.

29. The terminal according to claim 26, wherein the external component is provided by a service module, the service module is a persistence service for accessing data ones of the external components.

30. The terminal according to claim 29, wherein the data component defines data entities referenced by the executable elements.

31. The terminal according to claim 26, wherein the external component is provided by a service module, the service module is a presentation service for accessing presentation ones of the external components.

32. The terminal according to claim 31, wherein the presentation component defines the presentation and behavior of the application when presented on a user interface of the terminal.

33. The terminal according to claim 22, wherein the workflow is expressed in a platform neutral scripting language.

34. The terminal according to claim 33, wherein the external component is provided by a service module, the service module is configured for modification external to the expression of the executable elements of the workflow.

35. The terminal according to claim 33, wherein the external components are configured for modification external to the expression of the executable elements of the workflow.

36. The terminal according to claim 22, wherein the execution elements having as the non-executable content templates for describing application entities in a predefined language.

37. The terminal according to claim 36, wherein the language is a structured definition language.

38. The terminal according to claim 37, wherein the structured definition language is based on XML.

39. The terminal according to claim 22, wherein the external components are shared by a plurality of the applications.

40. The terminal according to claim 22, wherein the application is provided by a schema defined service through a network server coupled to the terminal, the terminal selected from the group comprising wired devices and wireless devices.

41. A computer program product for extending the capabilities of an application program for execution by a native runtime environment of a terminal, the application including a script based workflow and non-executable content, the computer program product comprising:

a computer readable medium;

a script interpreter module stored on the computer readable medium for interpreting the workflow, the workflow configured for having a plurality of executable elements;

a global symbol structure stored on the computer readable medium configured for reference by the executable elements, the global symbol structure including addressing for coupling selected ones of the executable elements to corresponding external components, the external components provided by the native runtime environment of the terminal for performing the action specified by the selected executable elements;

a proxy redirector module coupled to the global symbol structure for redirecting the selected ones of the execution elements during execution of the workflow, the selected ones of the execution elements being redirected to the respective external components through the corresponding global symbols of the global symbol structure;

wherein predefined knowledge of the contents of the global symbol structure is shared by the runtime environment and the workflow of the application.

* * * * *